Patented Oct. 20, 1925.

1,557,897

UNITED STATES PATENT OFFICE.

LEWIS L. TAYLOR, OF ORLANDO, FLORIDA.

COMPOSITION FOR THE TREATMENT OF DOG MANGE.

No Drawing. Application filed September 7, 1921. Serial No. 499,046.

*To all whom it may concern:*

Be it known that I, LEWIS L. TAYLOR, a citizen of the United States, residing at Orlando, in the county of Orange and State of Florida, have invented a new and useful Composition for the Treatment of Dog Mange, of which the following is a specification.

The invention relates to a solution for the treatment of dog mange.

The object of the present invention is the production of a simple, practical and efficient solution for the treatment and cure of dog mange.

My solution consists of a mixture of turpentine, linseed oil and sulphur in equal proportions in bulk, but the proportions may be varied within reasonable limits.

In preparing the solution the turpentine, linseed oil and sulphur are thoroughly mixed and in the treatment of dog mange, the mixture is applied externally in the ordinary manner and it has been tried successfully on very bad cases of dog mange and it has in every instance cured the disease with comparatively few applications.

While I have described the solution as a dog mange cure it, of course, may be applied for the treatment of similar animal diseases.

What is claimed is:

A dog mange remedy for external use, consisting of a solution of turpentine, linseed oil and sulphur in substantially equal proportions.

In testimony whereof I have hereunto set my hand.

LEWIS L. TAYLOR.